(12) United States Patent
Gill

(10) Patent No.: US 6,619,315 B2
(45) Date of Patent: *Sep. 16, 2003

(54) MASS FLOW CONTROLLER

(76) Inventor: Rajinder S. Gill, P.O. Box 2219, Pico Rivera, CA (US) 90662

( * ) Notice: Subject to any disclaimer, the term of this patent is extended or adjusted under 35 U.S.C. 154(b) by 0 days.

This patent is subject to a terminal disclaimer.

(21) Appl. No.: 10/377,039

(22) Filed: Feb. 28, 2003

(65) Prior Publication Data

US 2003/0127139 A1 Jul. 10, 2003

Related U.S. Application Data

(60) Division of application No. 09/741,552, filed on Dec. 19, 2000, now Pat. No. 6,543,466, which is a continuation-in-part of application No. 09/517,391, filed on Mar. 2, 2000, now Pat. No. 6,314,991.

(51) Int. Cl.$^7$ ................................. G05D 7/06
(52) U.S. Cl. ..................... 137/486; 137/487.5
(58) Field of Search ................. 137/486, 487.5

(56) References Cited

U.S. PATENT DOCUMENTS

| 3,386,472 A | 6/1968 | Szonntagh |
| 4,690,371 A | 9/1987 | Bosley et al. |
| 4,794,947 A * | 1/1989 | Kuramochi ................. 137/486 |
| 5,159,951 A | 11/1992 | Ono et al. |
| 5,711,342 A | 1/1998 | Kazama et al. |
| 5,820,100 A | 10/1998 | Fontaine et al. |
| 6,044,701 A | 4/2000 | Doyle et al. |
| 6,314,991 B1 * | 11/2001 | Gill ............................. 137/486 |
| 6,321,765 B2 | 11/2001 | Gill |
| 6,543,466 B2 | 4/2003 | Gill |

FOREIGN PATENT DOCUMENTS

WO    WO 01/65326    2/2001

* cited by examiner

*Primary Examiner*—Gerald A. Michalsky
(74) *Attorney, Agent, or Firm*—MacPherson Kwok Chen & Heid LLP

(57) ABSTRACT

A mass flow controller has a sensor section that generates an electrical signal, dependent on the measured flow rate. The controller sends a control signal to a magnetic field generating unit, dependent upon the actual flow rate and the desired flow rate, which in response, generates a magnetic flux in the direction of the fluid input to the fluid output through the body of the controller. This means that the magnetic flux is concurrent with the fluid flow within the mass flow controller body. The magnetic flux alters the position of a plunger button assembly, located between the bypass chamber and the fluid output, relative to an orifice plate to control the flow rate to obtain the desired output flow. By incorporating the proportional control valve within the mass flow controller body, the need for a separate and large valve section is eliminated, reducing the size and cost of the controller.

19 Claims, 19 Drawing Sheets

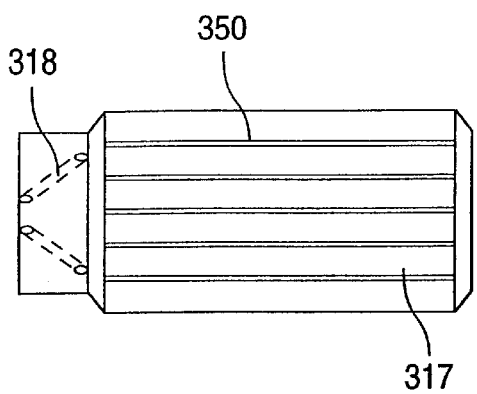
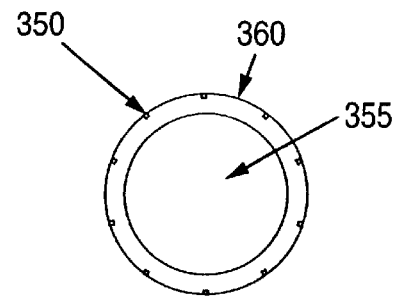
FIG. 3B-1                FIG. 3B-2
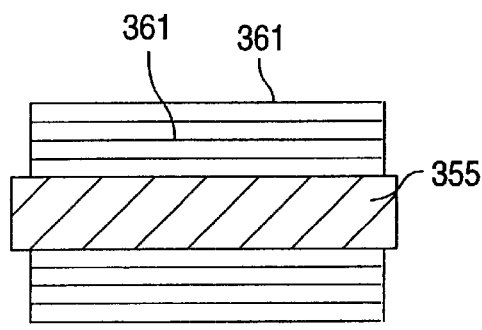
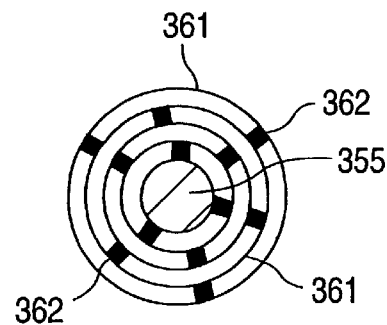
FIG. 3C-1                FIG. 3C-2
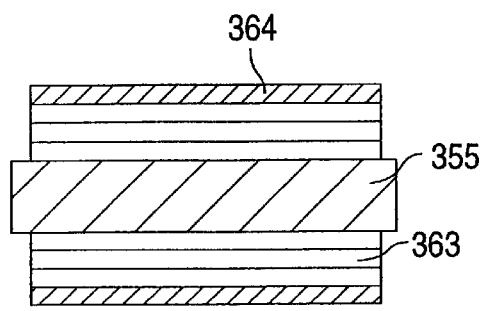
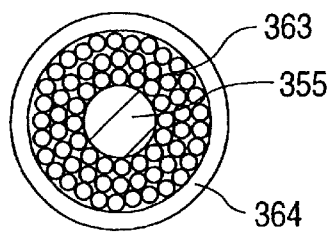
FIG. 3D-1                FIG. 3D-2

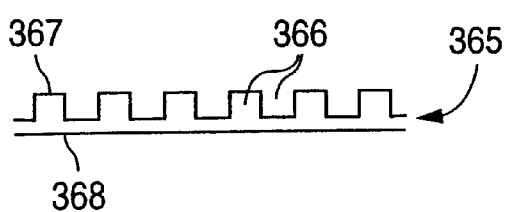
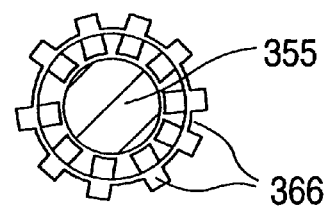
FIG. 3E-1  FIG. 3E-2
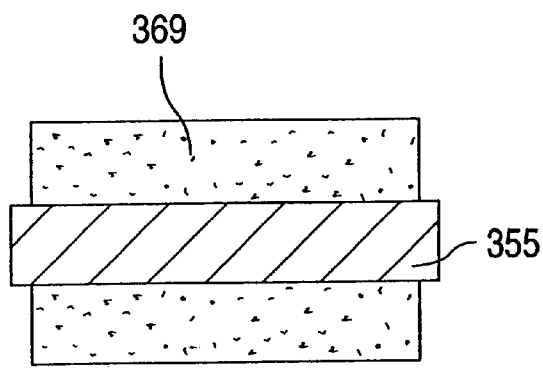
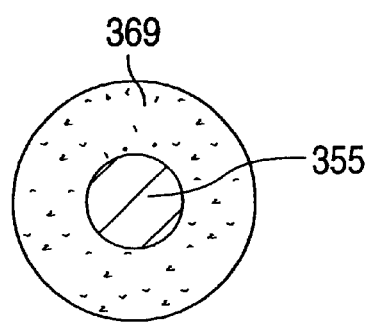
FIG. 3F-1  FIG. 3F-2
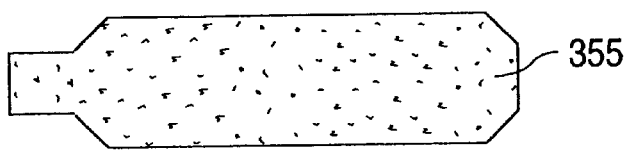
FIG. 3G

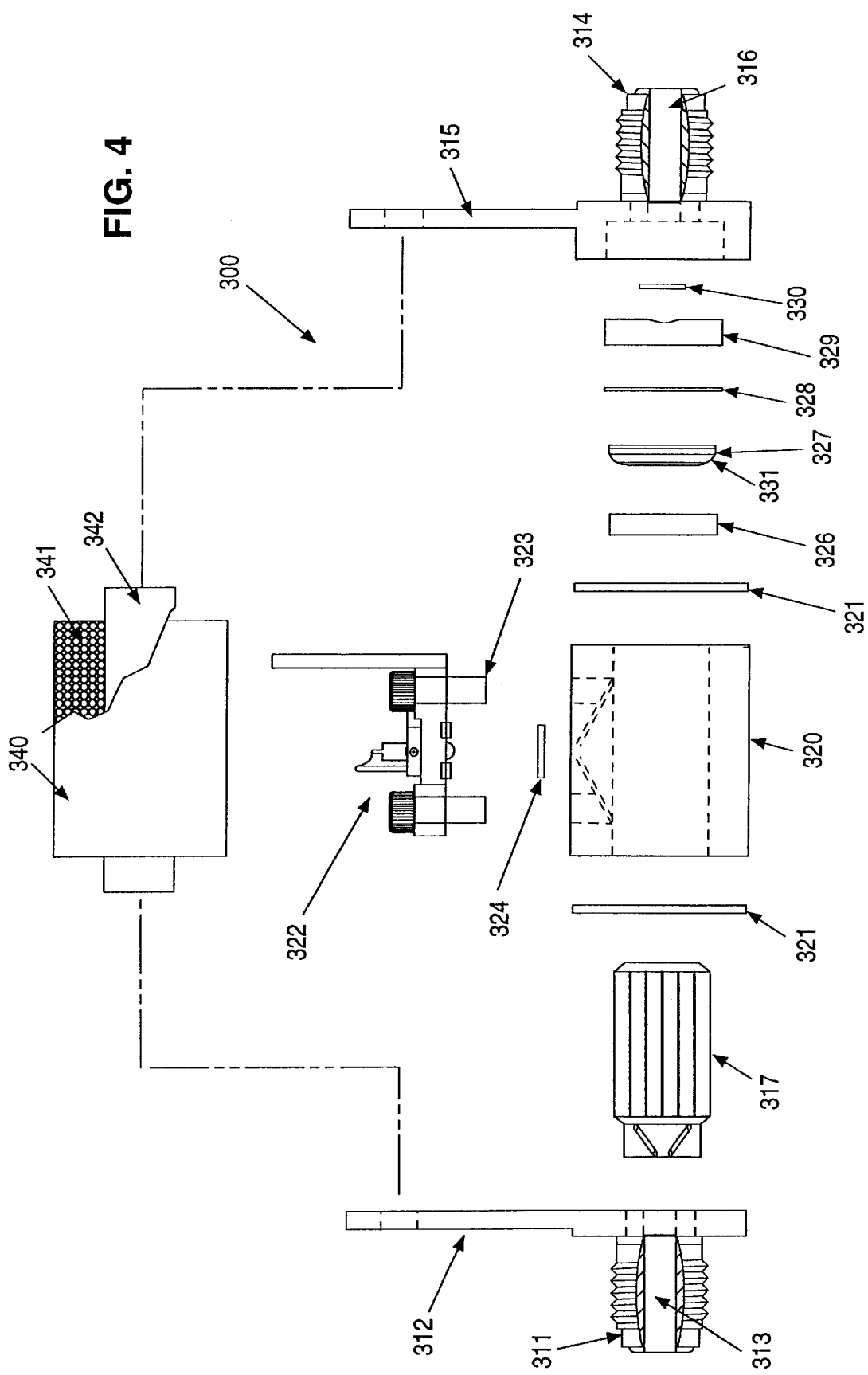

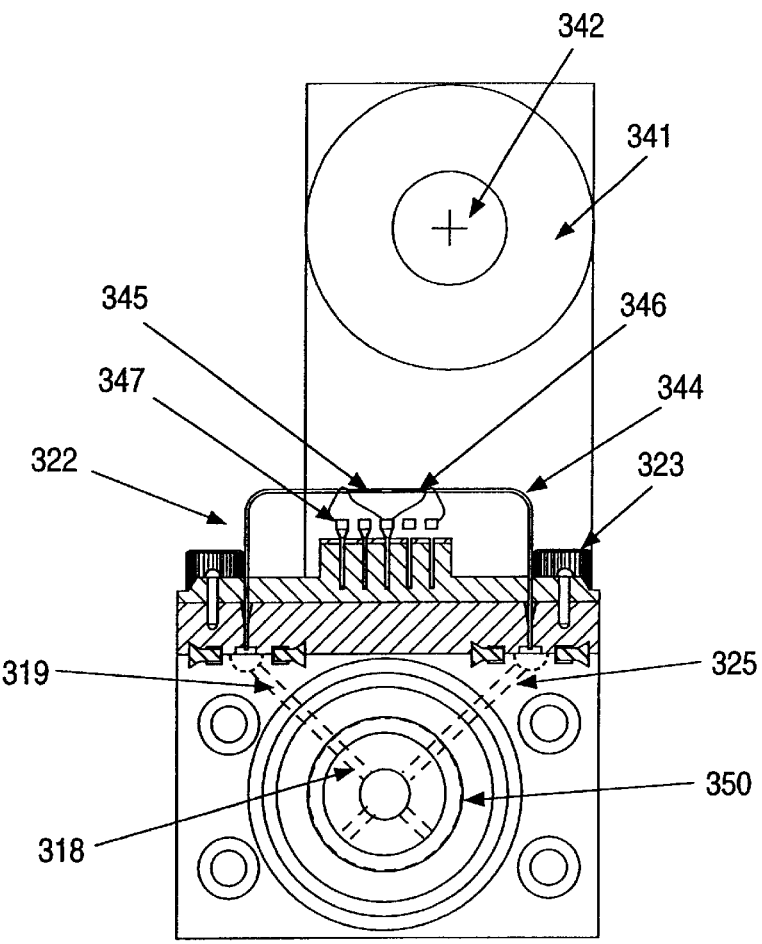
FIG. 5
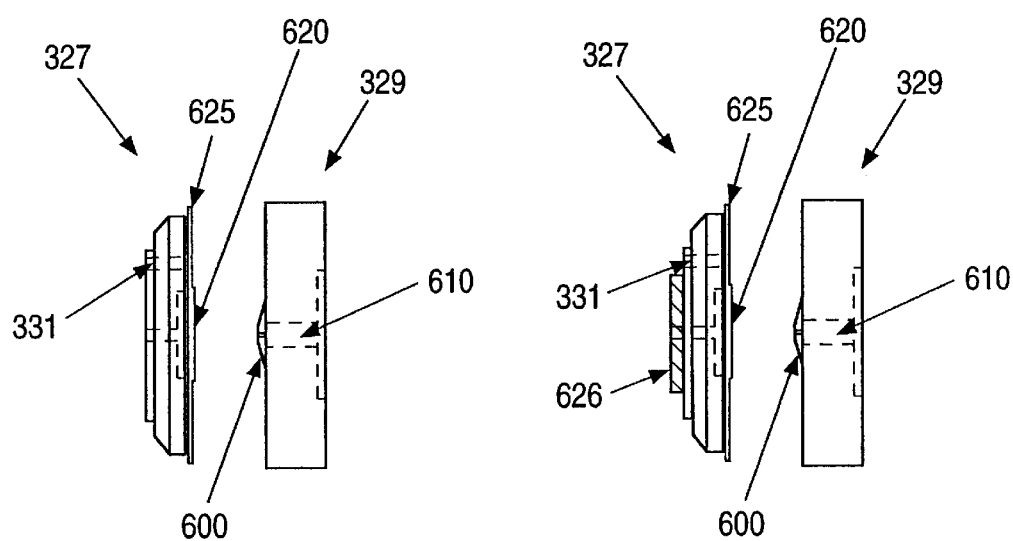
FIG. 6A  FIG. 6B

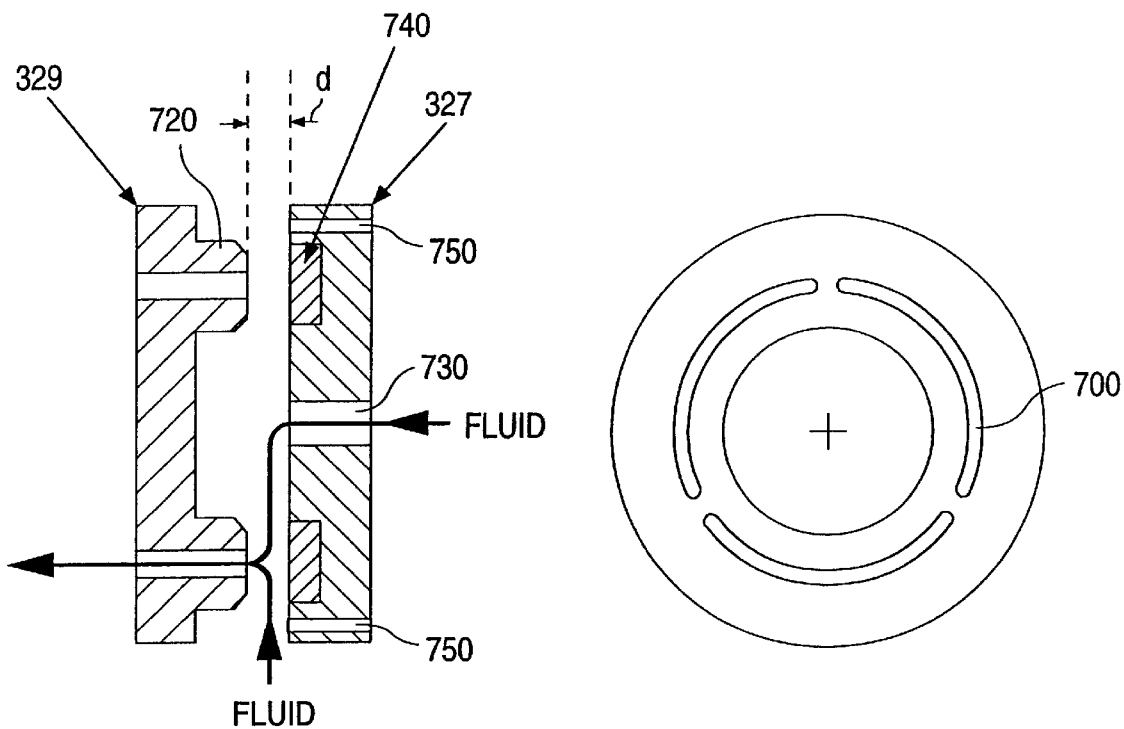
FIG. 7C
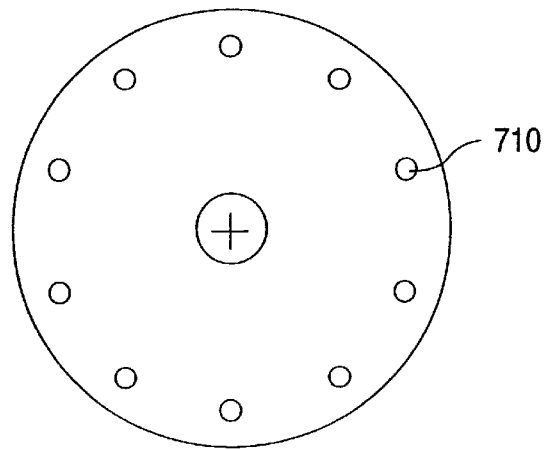
FIG. 7A
FIG. 7B

MASS FLOW CONTROLLER

CROSS-REFERENCE TO RELATED APPLICATIONS

This application is a divisional of U.S. patent application Ser. No. 09/741,552, filed Dec. 19, 2000, now U.S. Pat. No. 6,543,466, which is a continuation-in-part of U.S. patent application Ser. No. 09/517,391, filed Mar. 2,2000, now U.S. Pat. No. 6,314,991.

FIELD OF THE INVENTION

The present, invention relates to mass flow controllers.

DESCRIPTION OF RELATED ART

Mass flow controllers are known in the art for controlling the specific amount of flow of a fluid, necessary for a particular process, e.g., in semiconductor manufacturing processes, such as chemical vapor deposition or the like. Mass flow controllers are known to be capable of sensing the flow occurring through the controller and modifying or controlling that flow as necessary to achieve the required control of the mass of the fluid delivered to the particular process.

Sensing the flow is a function of the type of fluid utilized and the physical effect used to sense the amount of flow. One typical type of physical effect to sense mass flow is to measure the temperature differential between the upstream and downstream heater/sensor coils exposed to the fluid flow. Other systems may use absolute and/or differential pressure changes, light absorption, or the momentum change (e.g., paddle wheel) to measure the flow.

Modifying or controlling the flow is typically made in response to the sensed flow as it relates to the desired flow by modifying a cross-sectional opening area available to the fluid for flowing. The smaller the area available for flow, the smaller the mass flow, and vice-versa. In the past, this has been accomplished with a typical plunger/diaphragm/orifice system. An orifice provides the variable cross sectional opening area for flow, where the flow control is dictated by the positioning and motion of a plunger/diaphragm or needle stem in the orifice in response to a flow control signal. The flow control signal is generated in response to the measurement of the flow sensor.

A servo control section generates a control signal that drives the positioning of the plunger/diaphragm or needle stem, typically through the use of a solenoid type of driver. The solenoid driver has a ferromagnetic core surrounded by a coil. The plunger/diaphragm, typically made of ferromagnetic material, is held close to the orifice by a spring. The energizing of the coil generates a magnetic field that pulls the plunger/diaphragm away from the orifice while the spring pulls it toward the orifice. The distance between the orifice and the plunger/diaphragm is dependent upon the relative strengths of the magnetic field and the spring. The proportional control valve by its nature is not an open and shut valve. The closer the needle stem or plunger/diaphragm is to the orifice, the more restricted the flow becomes, until the flow is shut off, and the more it is withdrawn the more the flow increases, until it no longer affects the amount of flow.

For precision control, complex and expensive controller circuitry is needed to control the positioning and movement of the needle stem or plunger/diaphragm as the flow is regulated. The valve parts themselves must be manufactured with high precision, and are therefore expensive. In addition, prior art proportional controlled solenoid valve mass flow controllers require the needle stem or plunger/diaphragm to be mounted at right angles to the fluid flow direction. Consequently, the orifice is also mounted at right angles to the fluid flow path, and the fluid has to change direction to go through the orifice, which generates turbulence in the fluid.

Often the mass flow controller, particularly when used in high precision semiconductor manufacturing processes and the like, is part of a tool that has limited space available for the flow controllers, particularly if there are multiple mass flow controllers that are positioned in the immediate area of the actual discharge of the fluid into the tool's process chamber.

There is a need in the art, therefore, for a mass flow controller that is simpler, less expensive, smaller, and easier to manufacture and control.

SUMMARY OF THE INVENTION

The present invention, according to one embodiment, utilizes a closed loop magnetic flux path passing through the body of the controller in the direction of flow from its input to its output to magnetically operate a flexible plunger button valve assembly that is normally spring biased into the shut position. A current generated from a servo control section of a mass flow controller generates magnetic flux to pull the plunger valve assembly away from an orifice and allow more fluid to flow through. By controlling the amount of flux generated, and thereby the positioning of the button valve assembly relative to the orifice, the flow through the orifice can be controlled. Consequently, a large separate proportional control valve section is no longer necessary, which results in a more compact, less expensive and more reliable mass flow controller that is less costly to manufacture and has fewer components than the conventional mass flow controllers discussed above.

The present invention will be more fully understood upon consideration of the detailed description below, taken together with the accompanying drawings.

BRIEF DESCRIPTION OF THE DRAWINGS

FIGS. 3B-1 and 3B-2 show side and front views, respectively, of a bypass assembly of FIG. 3A according to one embodiment;

FIGS. 3C-1 and 3C-2 show side and front views, respectively, of a second embodiment of a bypass assembly;

FIGS. 3D-1 and 3D-2 show side and front views, respectively, of a third embodiment of a bypass assembly;

FIGS. 3E-1 and 3E-2 show side and front views, respectively, of a fourth embodiment of a bypass assembly;

FIGS. 3F-1 and 3F-2 show side and front views, respectively, of a fifth embodiment of a bypass assembly;

FIG. 3G shows a side view of a sixth embodiment of a bypass assembly;

FIG. 4 shows an exploded view of the mass flow controller of FIG. 3A;

FIG. 5 shows a sectional view of the mass flow controller of FIG. 3A along sectional line A–A';

FIG. 6A shows a side view of the button assembly and orifice plate shown in FIGS. 3A and 4;

FIG. 6B shows a side view of the button assembly and orifice plate according to another embodiment;

FIGS. 7A and 7B show different configurations of an orifice plate; and

FIG. 7C shows a side view of an orifice plate and button plunger assembly;

Use of the same reference symbols in different figures indicates similar or identical items.

DETAILED DESCRIPTION OF THE PREFERRED EMBODIMENTS

Figure 1A:
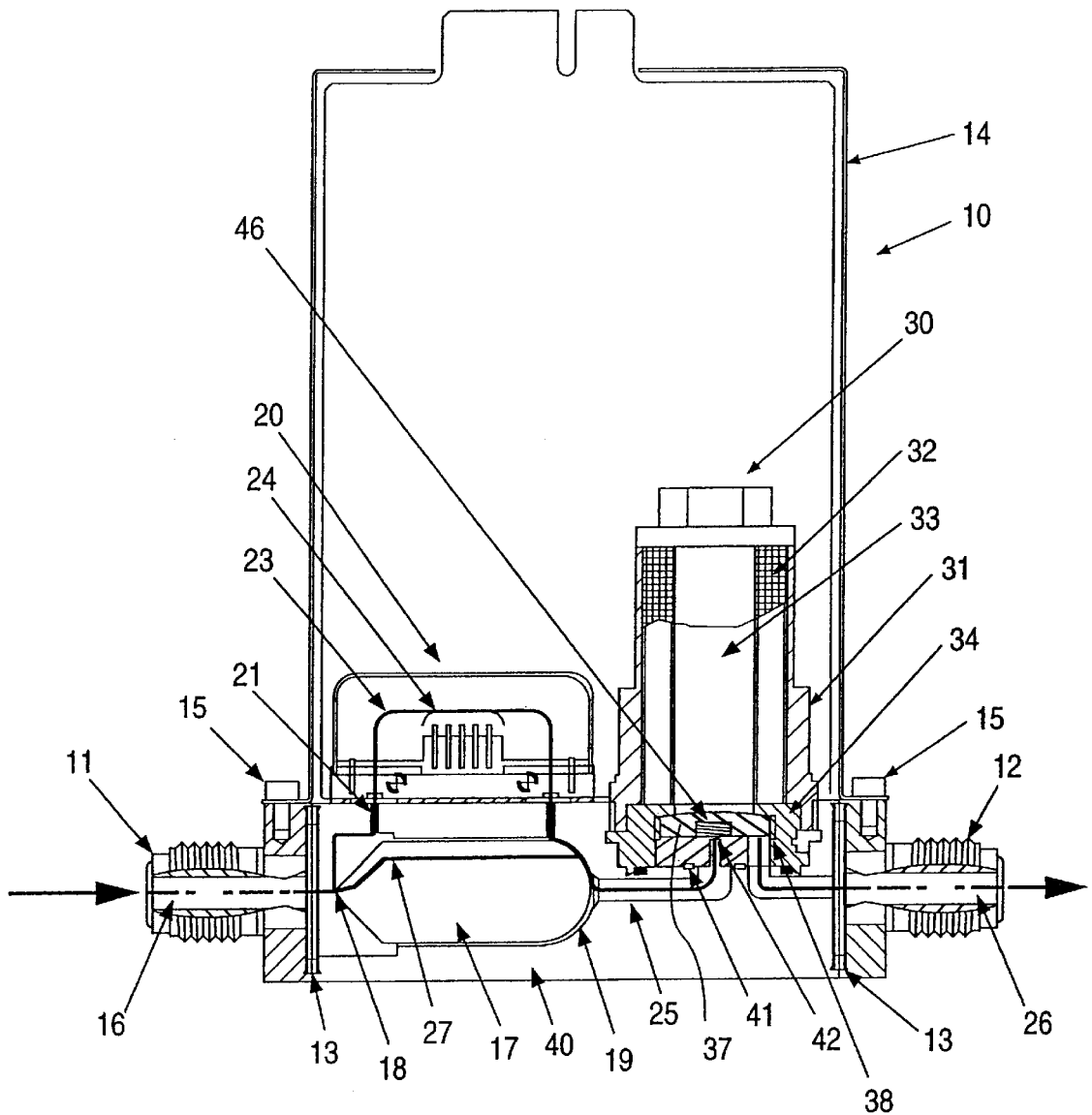
FIG. 1A shows a mass flow controller of the prior art.
Figure 2:
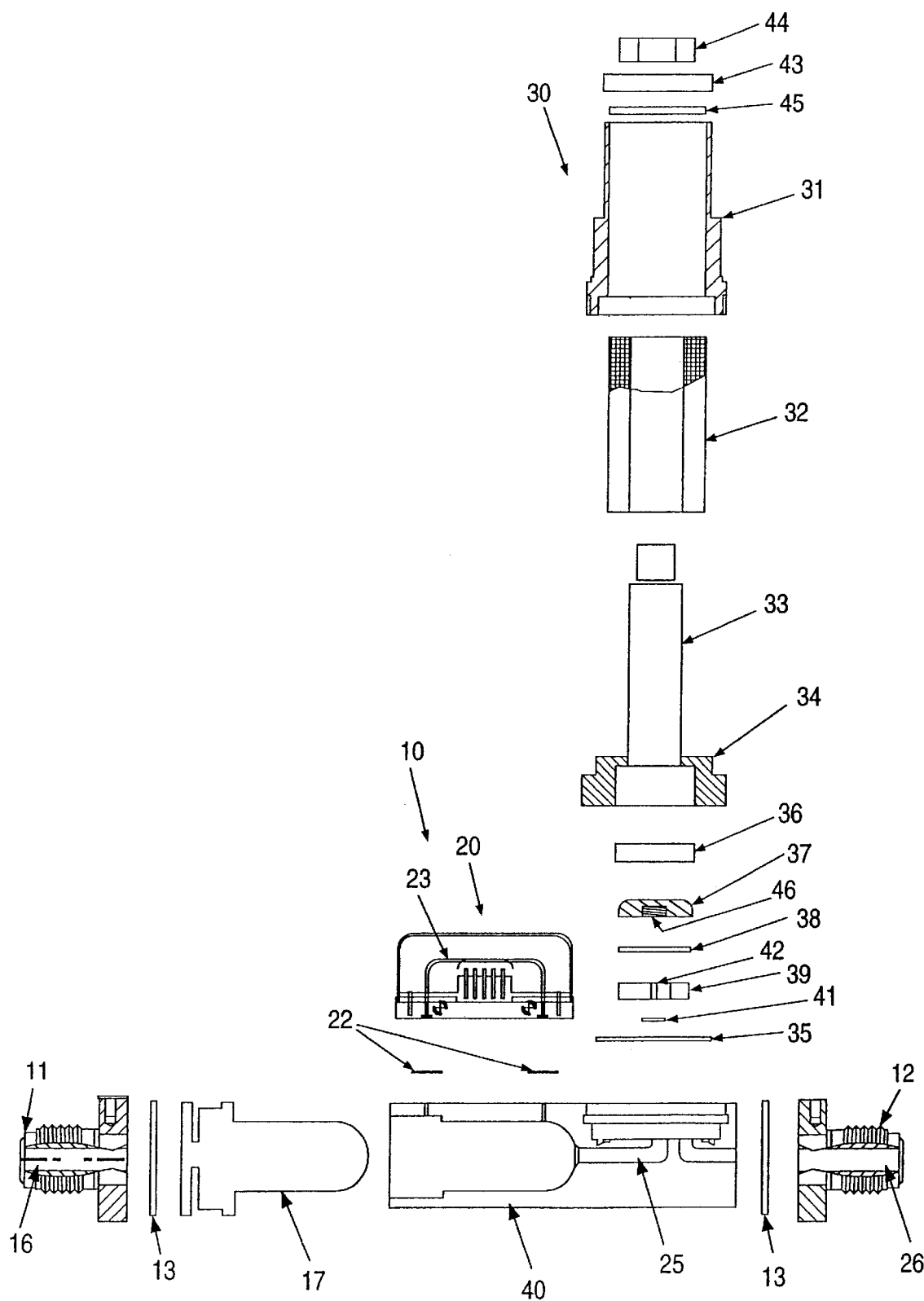
FIG. 2 shows an exploded view of the mass flow controller of FIG. 1A.

FIGS. 1A and 2 show a conventional mass flow controller 10. FIG. 1A shows an assembled controller 10, while FIG. 2 shows an exploded view of parts of controller 10. Mass flow controller 10 has three main sections: a sensor section 20, a valve section 30, and a mass controller block section 40. A fluid input fitting 11 and a fluid output fitting 12 are sealed to respective input and output ends of block section 40 through metal O-rings 13. Note that other seals are also suitable, such as knife edge, O-ring, C-ring, and flat gasket, made of materials such as metal, polymer, and elastomer. A cover 14 enclosing sensor section 20 and valve section 30 is secured to input and output fittings 11 and 12 by screws 15.

Gas or fluid enters input fitting 11 through an opening 16 in input fitting 11. The flow of fluid through mass flow controller 10 is shown in the dark lines in FIG. 1A. Opening 16 opens into a bypass assembly 17, which has an input plenum 18 and an output plenum 19, and which is located within block section 40. Sensor section 20 is secured to block section 40 via appropriate seals 22. While a majority of the fluid passes along bypass assembly 17, a portion of the fluid travels through sensor section 20 along a sensor tube 23. Bypass assembly 17 restricts the flow of fluid along one of a plurality of channels or grooves formed in the generally cylindrical outer surface of bypass assembly 17 and into output plenum 19. As is known in the art, this is for the purpose of generating a laminar flow such that a portion of the fluid passing from input plenum 18 into a sensor bypass line 21 and into sensor portion 20 is linearly proportional to the fluid passing from input plenum 18 to output plenum 19 through the plurality of channels or grooves in bypass assembly 17.

Sensor section 20 typically includes multiple coils 24 wrapped around sensor tube 23. When fluid flows inside sensor tube 23 from a heated upstream coil to a heated downstream coil that are electrically balanced, thermal energy is transferred from the coils to the flowing fluid. The amount of thermal energy transferred from the coils to the fluid is inversely proportional to the fluid temperature. Thermal energy transfer from the upstream coil and the downstream coil to the fluid is disproportionate because the fluid temperature is different at the upstream coil than at the downstream coil. This difference in heat transfer from the upstream coil and the downstream coil results in a temperature differential between the coils which manifests as a change in the relative resistance of the two coils. This change in resistance is directly proportional to the amount of fluid flowing through sensor tube 23. Typically, a resistor circuit (not shown), which is coupled to the upstream and downstream coils, is configured to form a balanced bridge network when there is no fluid flow. When the fluid flows, the resistance in the coils changes. The bridge network measures the change of the resistance in the coils and generates a signal corresponding to the flow of fluid through sensor tube 23.

Fluid from bypass assembly 17 and sensor tube 23 converge and flow into a fluid flow path 25. Fluid travels along fluid flow path 25, through valve section 30, and out through an opening 26 in output fitting 12. Valve section 30 includes an upper housing 31 enclosing a wound coil assembly 32 of a solenoid valve, which consists of a pole assembly or plug 33. Pole assembly 33 has a lower housing 34, which together with upper housing 31, are secured to block section 40 and sealed with an O-ring 35 or other appropriate seal. A plunger button assembly 37, having a flat sealing surface 46, is held in a cavity in lower housing 34 of pole assembly 33 by a plunger button capture ring 36. Plunger button capture ring 36, plunger button assembly 37, and a plunger button assembly pre-tensioning ring 38 are in abutting relation to an orifice plate 39, which is sealed to block portion 40 by an O-ring 41 or other appropriate seal.

Figure 1B:
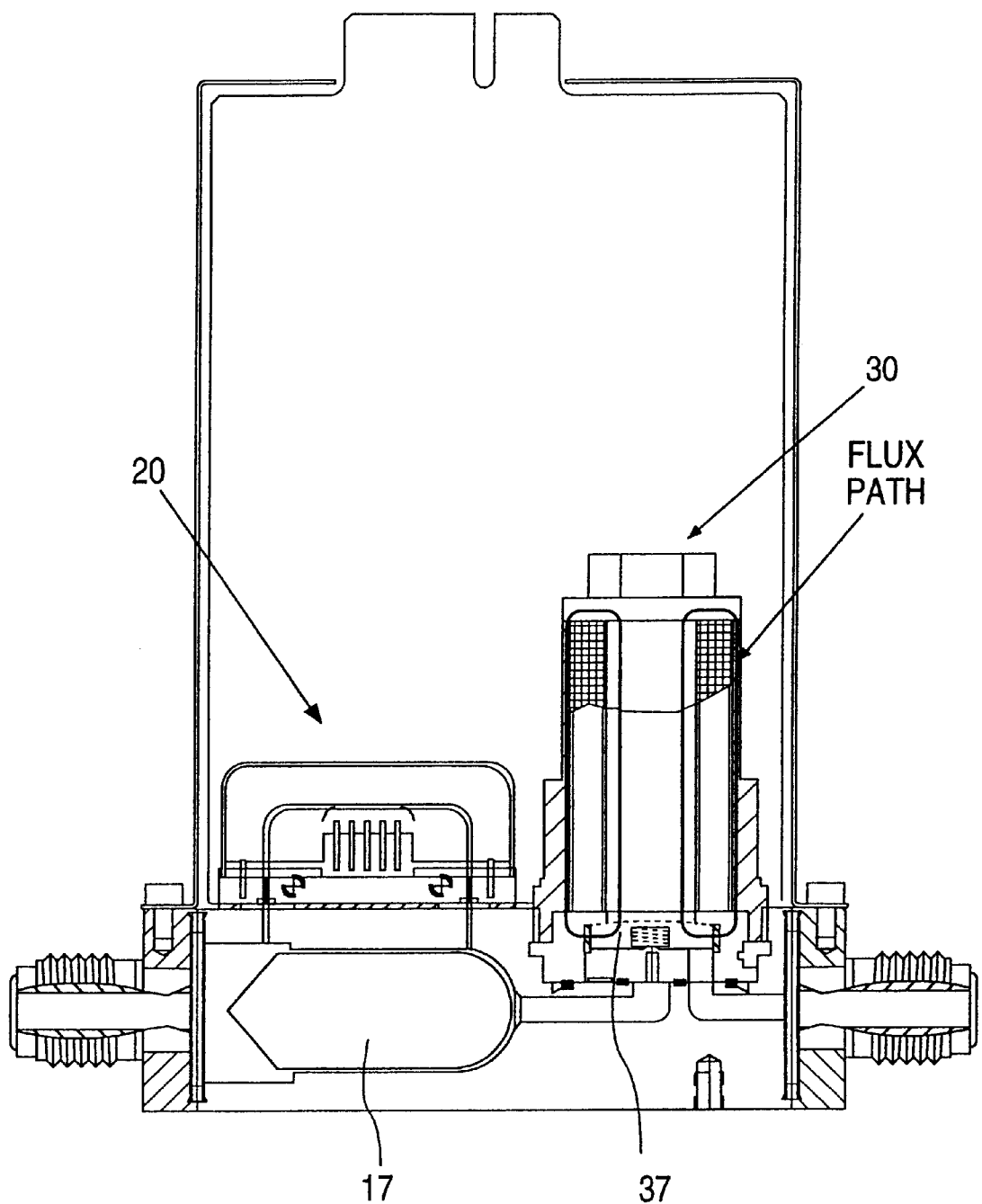
FIG. 1B shows magnetic flux path through a mass flow controller of FIG. 1A.

Orifice plate 39 has an opening 42 into which fluid flows from fluid flow path 25, where the flow of the fluid is controlled by the position of the plunger button assembly 37, relative to orifice opening 42. The relative position of plunger button assembly 37 is controlled by magnetic flux generated in core 33 in response to the signal generated from sensor block 20. Coil 32 is held in place by a top cap 43 and a pole nut 44. Top cap 43 is sealed with an O-ring 45. FIG. 1B shows the magnetic flux path of controller 10. As seen from FIG. 1B, the magnetic flux only travels through valve section 30 to control the position of plunger button assembly 37, and not through either sensor section 20, bypass assembly 17, or block 40.

Figure 3A:
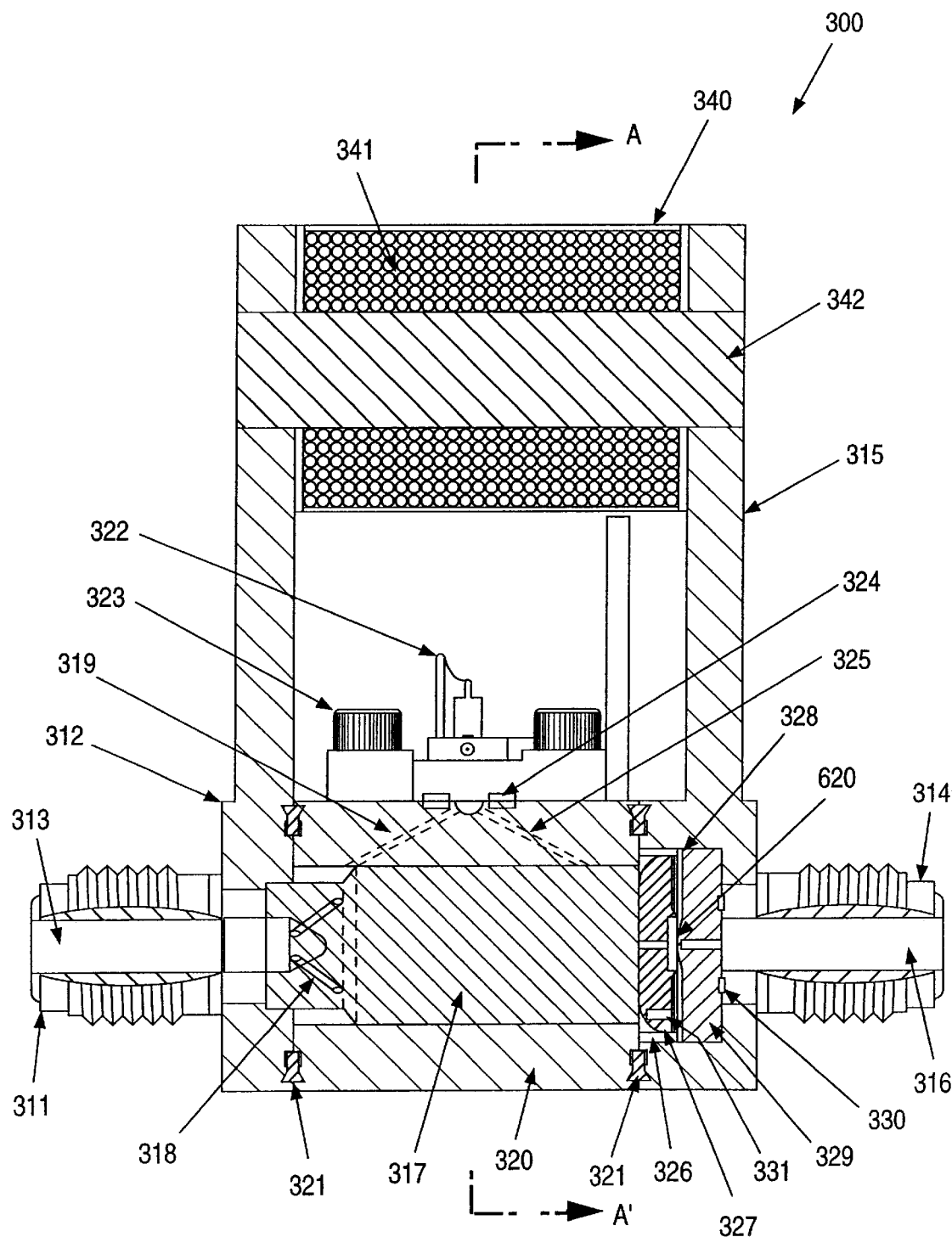
FIG. 3A shows a mass flow controller according to one embodiment of the present invention.

FIGS. 3A and 4 show a mass flow controller 300 according to one embodiment of the present invention. FIG. 3A shows an assembled controller 300, while FIG. 4 shows an exploded view of parts of controller 300. Mass flow controller 300 includes an input fitting 311 attached to an input magnetic flux plate 312, typically made of ferromagnetic material, where both input fitting 311 and input magnetic flux plate 312 have an opening 313 through which fluid enters and an output fitting 314 attached to an output magnetic flux plate 315, typically made of ferromagnetic material, where both output fitting 314 and output magnetic flux plate 315 have an opening 316 through which fluid exits. A mass controller block 320, typically made of non-ferromagnetic material, is sealed between input magnetic flux plate 312 and output magnetic flux plate 315 by O-rings 321 or other appropriate seals, which can be metal, plated metal, polymeric, or elastomeric material.

Fluid flows through opening 313 into a bypass assembly 317, typically formed with a ferromagnetic material, via distribution holes 318. Bypass assembly 317 can be a single part with longitudinal grooves or channels 350 formed directly thereon, or in other embodiments, bypass assembly can be formed from more than one part, as shown in FIG. 3B. For example, bypass assembly 317 can be formed from an inner core 355 and an outer sleeve 360 having grooves 350 formed along the outer perimeter. Inner core 355 can be of a ferromagnetic material, while outer sleeve 360 can be of a non-magnetic material. In another embodiment, inner core 355 is made of a non-magnetic material, and outer sleeve 360 is made of a ferromagnetic material.

Other embodiments of bypass assembly 317 are shown in FIGS. 3C-1 and 3C-2 to 3F-1 and 3F-2, and 3G, where "−1" indicates a side view and "−2" indicates a front view. In each of these embodiments, a bypass assembly 317 includes a ferromagnetic core and pathways along the longitudinal direction of the bypass assembly that allow fluid to flow from one end of the assembly to the other. In FIGS. 3C-1 and 3C-2, ferromagnetic core 355 is surrounded by concentric tubes 361 held in place by ribs 362. Fluid flows along channels created by concentric tubes 361 and ribs 363. In FIGS. 3D-1 and 3D-2, ferromagnetic core 355 is surrounded by longitudinal tubes 363 in one or more layers, enclosed by a non-magnetic body 364. Fluid flows through tubes 363. In FIGS. 3E-1 and 3E-2, ferromagnetic core 355 is surrounded by one or more laminated sheets 365 having channels 366, which can be formed by laminating a channeled sheet 367 to a flat sheet 368. Laminated sheet 365 is then wound around ferromagnetic core 355. Additional sheets can be wound around an inner sheet to provide multiple channels through which fluid can flow. In FIGS. 3F-1 and 3F-2, ferromagnetic core 355 is surrounded by a porous material 369, which allows fluid to flow through. In FIG. 3G, core 355 is made of a ferromagnetic porous (sintered) material. Thus, core 355 functions as the path for both the magnetic flux as well as the fluid flow through bypass assembly 317.

Going back to the embodiment of FIGS. 3B-1 and 3B-2, the fluid flows along longitudinal flow groves along the outer circumference of bypass assembly 317. Fluid also flows through distribution holes 318 to a flow sensor input line 319 formed within block 320. Input line 319 directs the flow to a sensor unit 322, which is secured to block 320 by screws 323 and two O-rings 324 or other appropriate seals. One O-ring 324 seals the interface between sensor unit 322 and input line 319 of block 320 and second O-ring 324 seals the interface between sensor unit 322 and an output line 325 formed within block 320. Fluid from output line 325 and bypass assembly 317 travels through a plunger button assembly capture spacer 326, typically made of ferromagnetic material, a plunger button assembly 327, (which includes a plunger made of ferromagnetic material, a spring, and a sealing surface), a plunger button pre-tension spacer 328, an orifice plate 329 typically made of non-magnetic material, and an orifice metal O-ring 330 or other seal, and out through opening 316 in output fitting 314. Plunger button assembly 327 and orifice plate 329 are shown in greater detail in FIG. 6A. Plunger button assembly capture spacer 326 secures plunger button assembly 327, spacer 328, orifice plate 329, and O-ring 330 within a cavity in output magnetic flux plate 315.

Figure 3H:
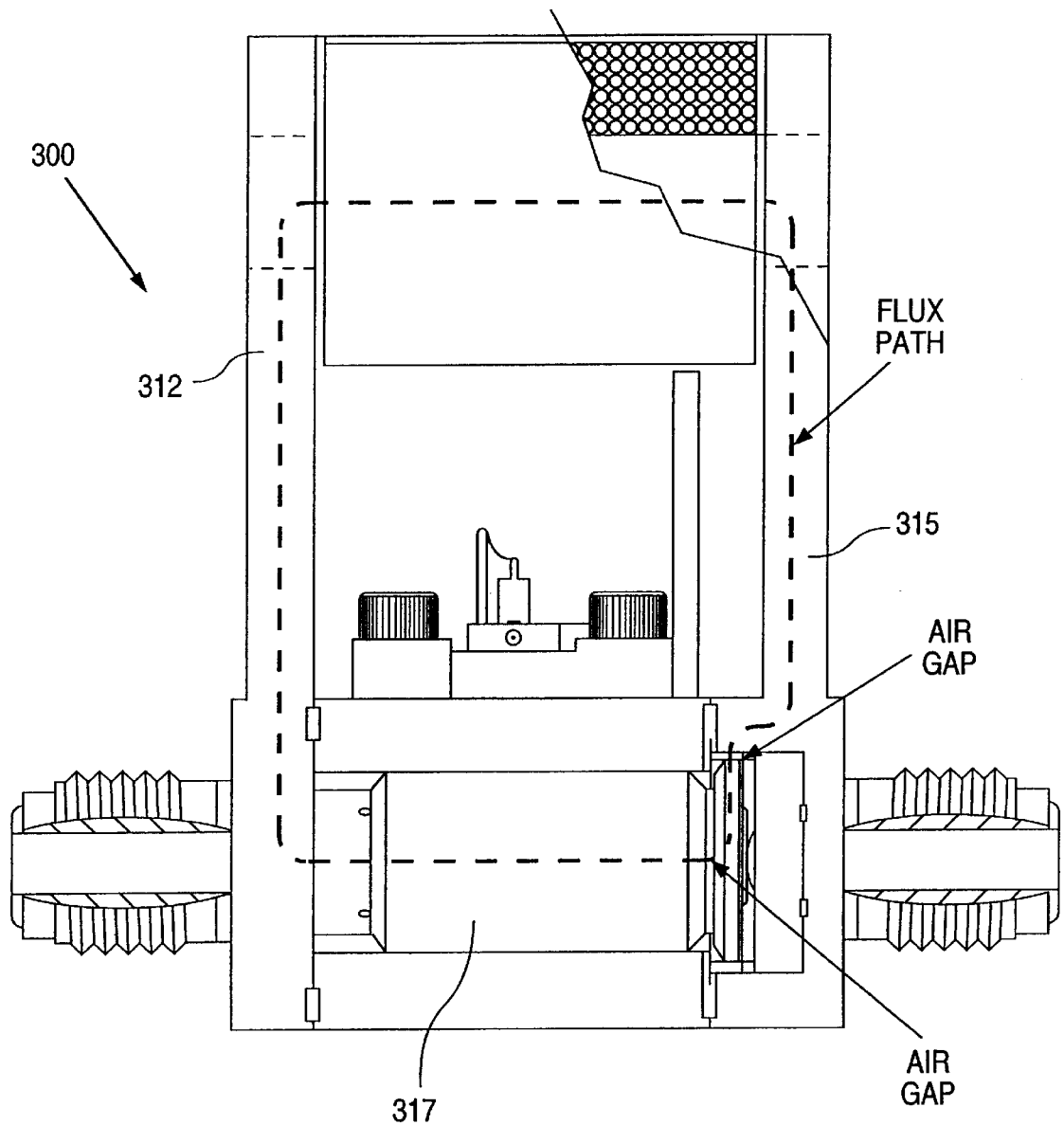
FIG. 3H shows magnetic flux path through a mass flow controller of FIG. 3A.

In addition, mass flow controller 300 of the present invention includes a magnetic field generating unit 340. Magnetic field generating unit 340 includes a coil 341 and a core 342 inserted into a cylindrical opening within coil 341. Core 342 is a cylindrical plug, typically made of a ferromagnetic material, which is inserted into openings in the upper portion of input magnetic flux plate 312 and output magnetic flux plate 315. Magnetic flux generated by unit 340 is directed down through input magnetic flux plate 312, to bypass assembly 317, to plunger button assembly 327, and back up through output magnetic flux plate 315. FIG. 3H shows the magnetic flux path of controller 300. As seen in FIG. 3H, the magnetic flux travels substantially with the fluid flow within the body of controller 300, i.e., from input magnetic flux plate 312 and through bypass assembly 317 to output magnetic flux plate 315. This is contrasted with the magnetic flux path of conventional controllers, such as shown in FIG. 1B.

FIG. 5 is a sectional view of mass flow controller 300 along sectional line A–A' of FIG. 3A. FIG. 5 shows that sensor unit 322 is rotated approximately 90° from the orientation of conventional mass flow controller 10 shown in FIGS. 1A and 2. In other words, fluid flowing through sensor unit 322 is orthogonal to the flow direction of the fluid through bypass assembly 317 according to the present invention, whereas the flow directions are parallel with the controller shown in FIGS. 1A and 2. Sensor unit 322 is a conventionally known and used thermal mass flow sensor. The majority of the fluid flows through bypass assembly 317 along flow grooves 350 formed longitudinally on the outer surface of bypass assembly 317. Some of the fluid flows from distribution holes 318 to flow sensor input line 319 and into a flow sensor tube 344. Sensor tube 344 has wrapped around its outside a first heater/sensor coil 345 and a second heater/sensor coil 346, which are connected to terminals 347.

Passing current through first coil 345 heats the fluid as it passes through sensor tube 344 in the vicinity of first coil 345. Current is also passed through second coil 346 wrapped around sensor tube 344 in the downstream flow direction of the fluid, i.e., towards output line 325. As the fluid passes second coil 346, it gets hotter. However, the amount of heat transferred from coils 345 and 346 to the fluid is different because the fluid temperature is different at coils 345 and 346. This in turn changes the relative resistance of coils 345 and 346, which is measured as a voltage differential in an electrical bridge (i.e., a Wheatstone bridge). This voltage differential corresponds to the mass flow amount of fluid passing through sensor tube 344, and, proportionately, through bypass assembly 317. Controller unit 300 includes electronic circuitry, not shown, to calculate the mass flow based upon the sensed change in voltage. A servo control section of controller 300 then generates a current signal for magnetic field generating unit 340, which in turn generates magnetic flux proportional to the signal to move plunger button assembly 327 to control the flow. The servo control system generates current through the coil to generate sufficient magnetic flux until the error signal is minimized or approximately zero. Such systems are conventional and known to those skilled in the art.

FIG. 6A shows, in more detail, plunger button assembly 327 and orifice plate 329 according to one embodiment. Orifice plate 329 is generally flat on both faces, with the face toward button assembly 327 having a frusto-conical portion 600. Frusto-conical portion 600 has an opening 610 extending through orifice plate 329 such that fluid can flow through orifice plate 329 to opening 316 in output fitting 314. Plunger button assembly 327 has a smooth flat sealing surface 620 that sits on to frusto-conical portion 600. Plunger button assembly 327 also has openings 331 located outside sealing surface 620 for fluid to pass through. A spacer 328 (shown in FIG. 4) is positioned between plunger button assembly 327 and orifice plate 329. Spacer 328 is intended for the purpose of creating an appropriate amount of compression between plunger button assembly 327 and frusto-conical portion 600 by allowing a spring 625 in plunger button assembly 327 to bend to a desired extent by plunger button assembly capture spacer 326. The thinner the spacer 328, the greater the bending of spring 625 in plunger button assembly 327, consequently creating greater compression between plunger button assembly 327 and frusto-conical portion 600.

Fluid flows through openings 331 around the outer edges of surface 620 as well as around the outer edges of plunger button assembly 327 so that fluid can flow from bypass assembly 317 to opening 610 of orifice plate 329. The amount of fluid flowing into opening 610 depends on the positioning of plunger button assembly 327 in relation to orifice plate 329. As the attractive force to plunger button assembly 327, which is created by the magnetic flux, increases, plunger button assembly 327 is moved away from orifice plate 329, thereby increasing the amount of fluid flowing into opening 610. However, as the force decreases, the spring pushes button assembly 327 towards orifice plate 329, thereby decreasing the fluid flow into opening 610. The spring force of the spring should be as small as possible, yet sufficient to seal opening 610 to give a zero flow through opening 610. Zero flow means less than 0.5% of the mass flow controller range.

FIG. 6B shows another embodiment of plunger button assembly 327 in which a magnet 626 is attached to the side of plunger button assembly opposite sealing surface 620. By changing the flux direction and magnitude through bypass assembly 317, plunger button assembly 327 can be moved either away from or towards orifice plate 329, thereby controlling the flow of fluid through orifice plate 329. For example, if the magnetic flux creates a pole on the end of bypass assembly 317 that is opposite in polarity to magnet 626, the attractive force between bypass assembly 317 and plunger button assembly 327 (via magnet 626) will pull plunger button assembly 327 away from orifice plate 329, which allows fluid to flow. If the magnetic flux creates a pole that is the same in polarity as magnet 626, bypass assembly 317 will force plunger button assembly 327 into orifice plate 329, which will shut off the fluid flow. Thus, depending on the magnitude and direction of the flux and the strength of magnet 626, a desired fluid flow can be obtained.

In the above described embodiments, opening 610 in orifice plate 329 is a central through hole. However, in other embodiments, opening 610 can be an annular ring of slots 700 (shown in FIG. 7A) or holes 710 (shown in FIG. 7B), or a combination of both. In these embodiments, the annular ring of holes or slots extend through protruded portions 720 of orifice plate 329, shown in FIG. 7C. Plunger button assembly 327 has a central hole 730 or slots (not shown) and sealing surface 740, which abuts against protruded portions 720 of orifice plate 329. Without any magnetic flux, protruded portions 720 are sealed against sealing surface 740, thereby preventing fluid from flowing through the holes or slots in orifice plate 329. When magnetic flux is generated, plunger button assembly 327 is pulled away from orifice plate 329 to allow fluid flow through orifice plate 329. Fluid flows through hole 730 of plunger button assembly 327 and holes or slots 750 on the outer edge of sealing surface 740 as well as from the outer perimeter of plunger button assembly 327 to the openings of orifice plate 329.

The size and number of slots 700 or holes 710 can be chosen to make the mass flow controller for a desired flow rate. For a given flow rate, the area of the slots (FIG. 7A) or holes (FIG. 7B) should be minimized to reduce the back pressure, resulting in less force required (less magnetic flux and therefore less current required) to move plunger button assembly 327. However, this area must not be minimized to the extent that choking occurs when fluid is attempting to pass through orifice plate 329. Choking can also occur in the peripheral area of the slots or holes. Therefore, the peripheral area of the slots or holes should be greater than or equal to the cross-sectional area of the slots or holes. Referring to FIGS. 7A–7C, the peripheral area can be defined as the perimeter of the slots or holes times a displacement distance d. Distance d is the maximum distance between plunger button assembly 327 and the end of protruded portions 720 for a given flow rate, as shown in FIG. 7C.

Therefore, for a given flow rate and cross-sectional area of slots 700, the peripheral area of the slots can be made equal to or greater than the cross-sectional area of the slots by either increasing the perimeter of the slots or increasing the distance d. Increasing distance d requires more magnetic force to achieve the desired flow rate. On the other hand, increasing the perimeter of the slots, which can be done by increasing the length of the slots and decreasing the width of the slots, allows the peripheral area of the slots to be increased without changing the cross-sectional area of the slots. Consequently, the back pressure is not adversely increased or affected. However, the same effect cannot be realized by using holes instead of slots because increasing the perimeter or circumference of the holes also increases the cross-sectional area of the holes.

Figure 8:
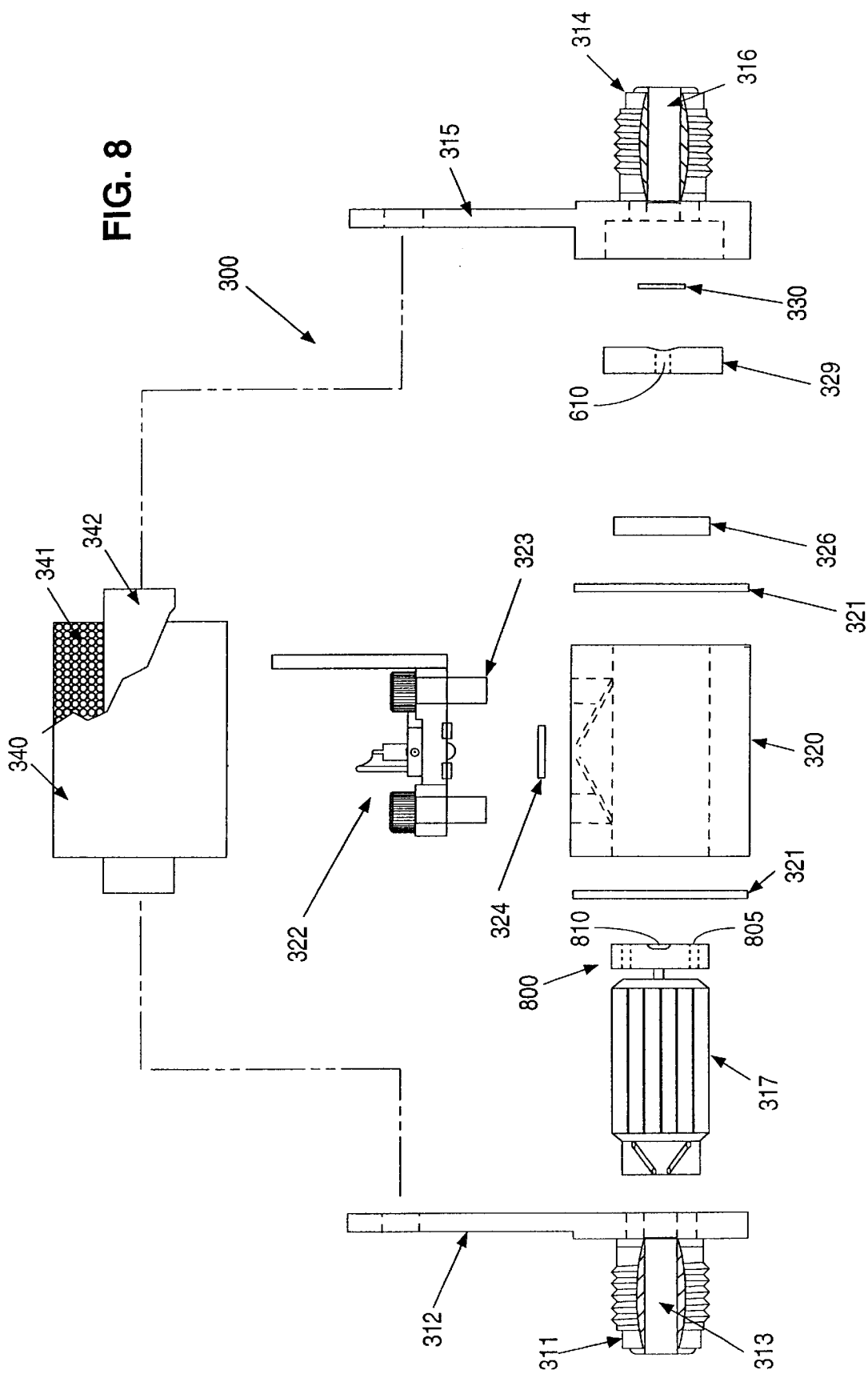
FIG. 8 shows an exploded view of a mass flow controller according to another embodiment of the present invention.

FIG. 8 shows another embodiment of the present invention, in which bypass assembly 317 is made of a magneto-restrictive material, instead of a ferromagnetic material described above. The end of bypass assembly 317 facing output magnetic flux plate 315 is secured to a sealing device 800 having holes 805 for fluid to flow through and a sealing area 810 that abuts orifice plate 329 to prevent fluid from flowing through opening 610 in orifice plate 329. In the normal biased position, sealing device 800 abuts orifice plate 329 when sufficient magnetic flux is generated to seal opening 610. Magnetic flux travels from input magnetic flux plate 312 toward output magnetic flux plate 315 through bypass assembly 317 and sealing device 800. When the magnetic flux is reduced, the magneto-restrictive material constricts, which allows fluid to flow through opening 610 in orifice plate 329. Then, when the magnetic flux is increased, bypass assembly 317 expands until sealing device 800 seals opening 610. This allows plunger button assembly 327 and plunger button assembly pre-tension spacer 328 of FIG. 4 to be eliminated.

Figure 9:
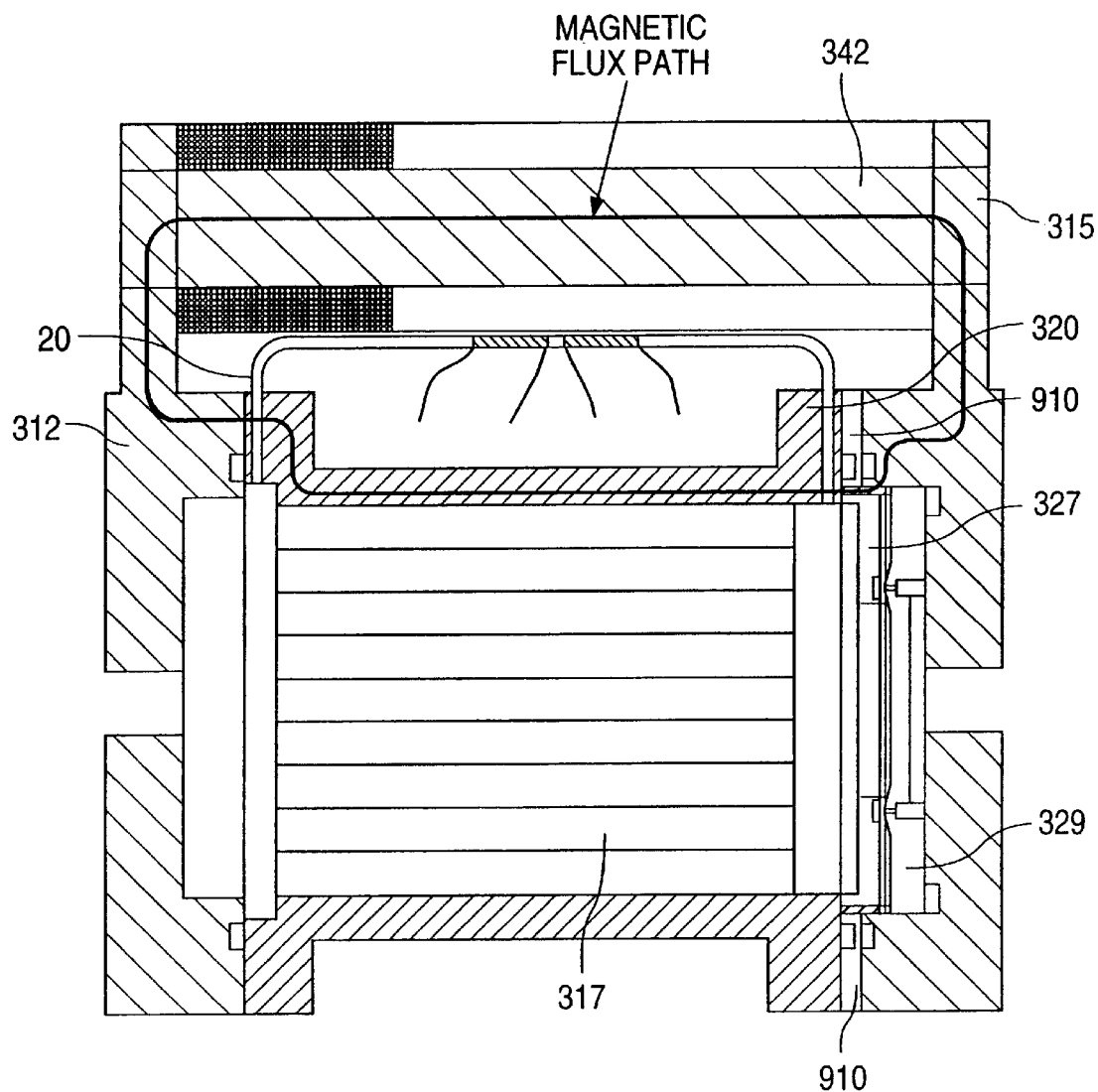
FIG. 9 shows magnetic flux path through a mass flow controller according to another embodiment of the present invention.
Figure 10:
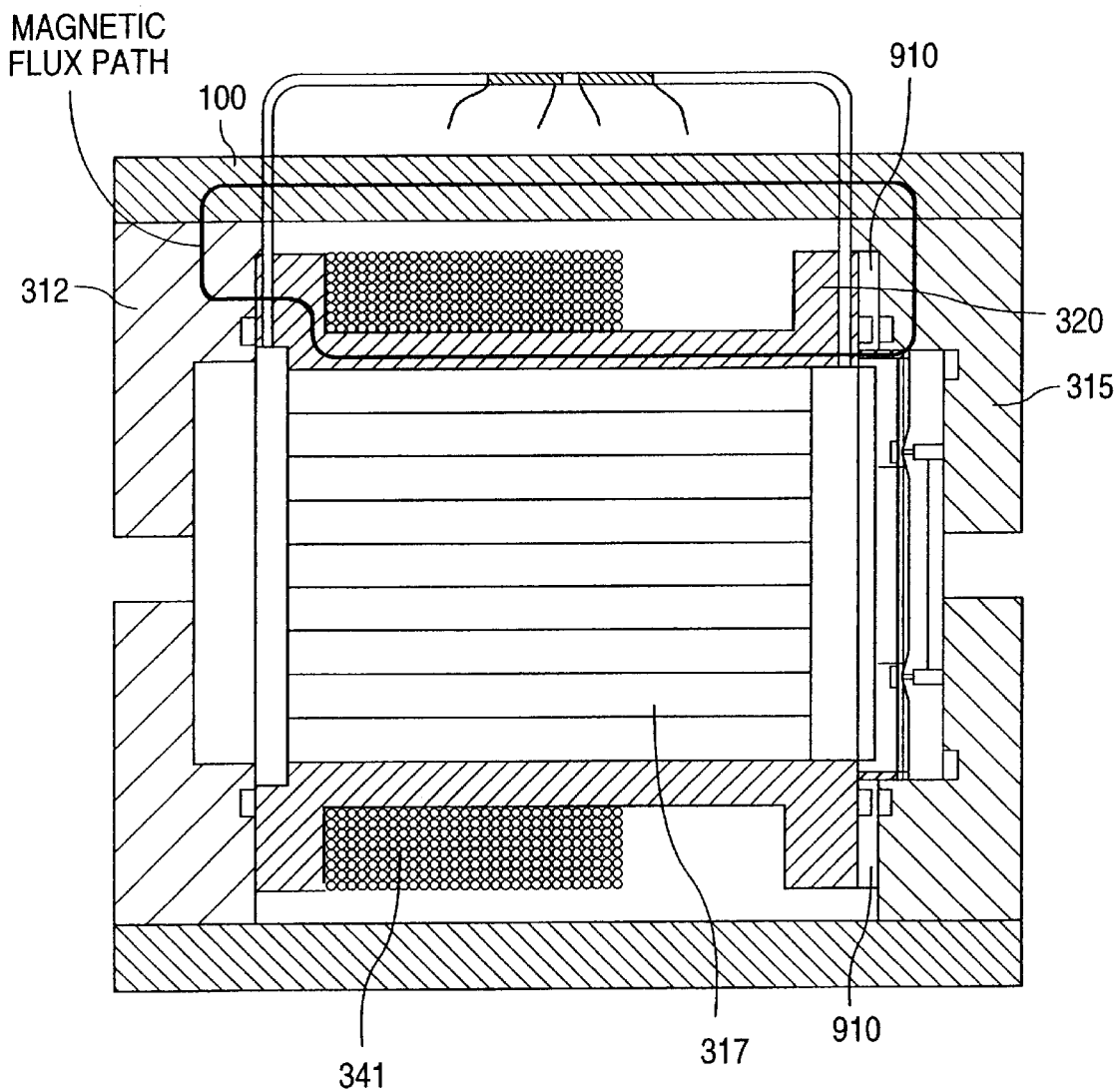
FIG. 10 shows magnetic flux path through a mass flow controller according to yet another embodiment of the present invention.

In the above described embodiments, the magnetic flux travels through bypass assembly 317. In other embodiments, shown in FIGS. 9 and 10, the magnetic flux path travels through the body of the mass flow controller. In FIG. 9, the magnetic flux path (shown as a solid black line) travels through core 342, along input magnetic flux plate 312, through mass controller block 320, which in this embodiment is typically made of a ferromagnetic material, through plunger button assembly 327 and back up through output magnetic flux plate 315. A magnetic flux separator plate or washer 910, typically made of a non-magnetic material, is located between mass controller block 320 and output magnetic flux plate 315 so that the magnetic flux travels through plunger button assembly 327 to control the fluid flow through orifice plate 329. In FIG. 10, coil 341 is wound around mass controller block 320. Mass controller block 320, typically made of a ferromagnetic material, encloses bypass assembly 317. An outer cover 100, typically made of a ferromagnetic material, encloses coil 341 and block 320. Similar to FIG. 9, magnetic flux separator plate or washer 910 separates mass controller block 320 from output magnetic flux plate 315. Accordingly, as shown in FIG. 10, the generated magnetic flux (shown as a solid black line) travels through block 320 to plunger button assembly 327, up through output magnetic flux plate 315, along outer cover 100, and down through input magnetic flux plate 312. Note that in the embodiments shown in FIGS. 9 and 10, fluid flows through sensor section 20 (FIGS. 1A and 1B) parallel to the flow of fluid through bypass assembly 317. However, the embodiments shown in FIGS. 9 and 10 are also suitable with sensor unit 322 (FIGS. 3A and 5) that allows fluid to flow perpendicular to the flow of fluid through bypass assembly 317.

Figure 11:
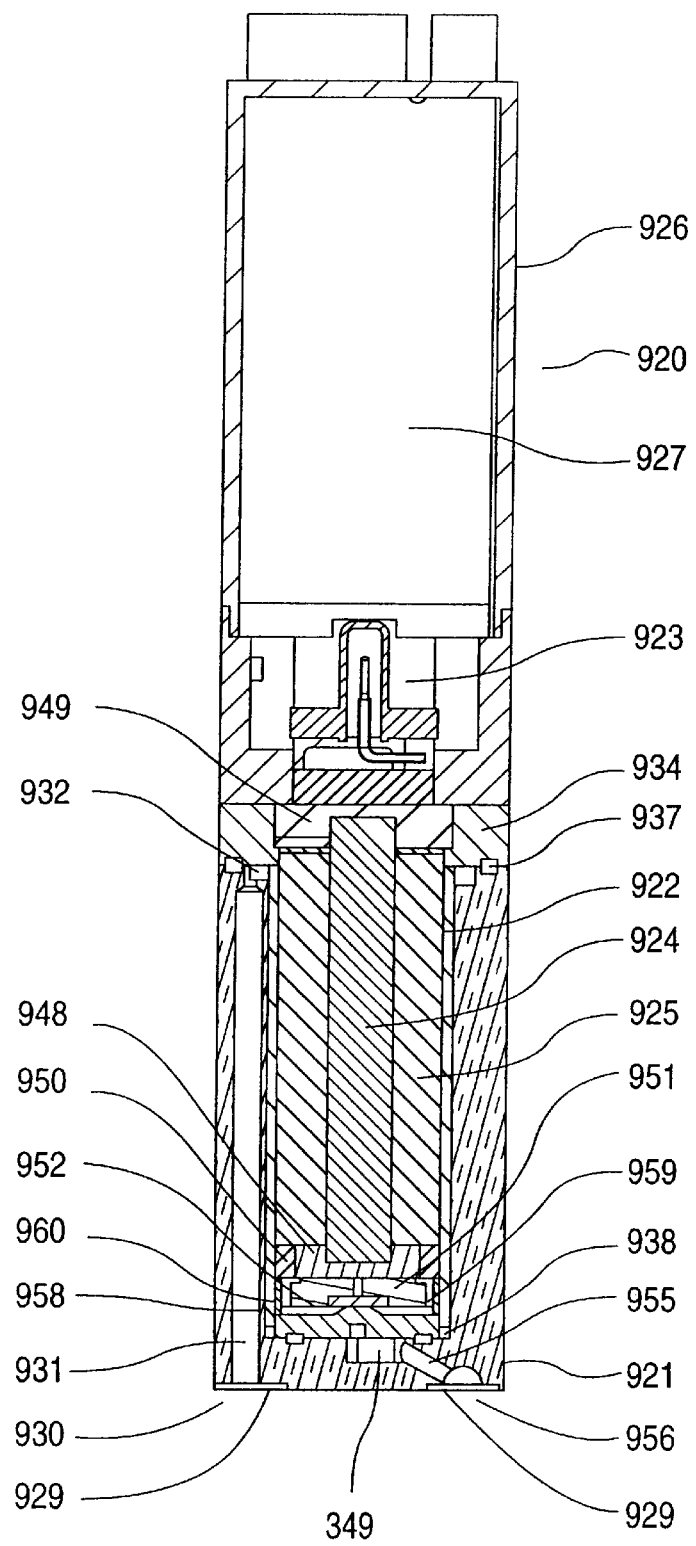
FIG. 11 shows a mass flow controller according to another embodiment of the present invention.
Figure 14:
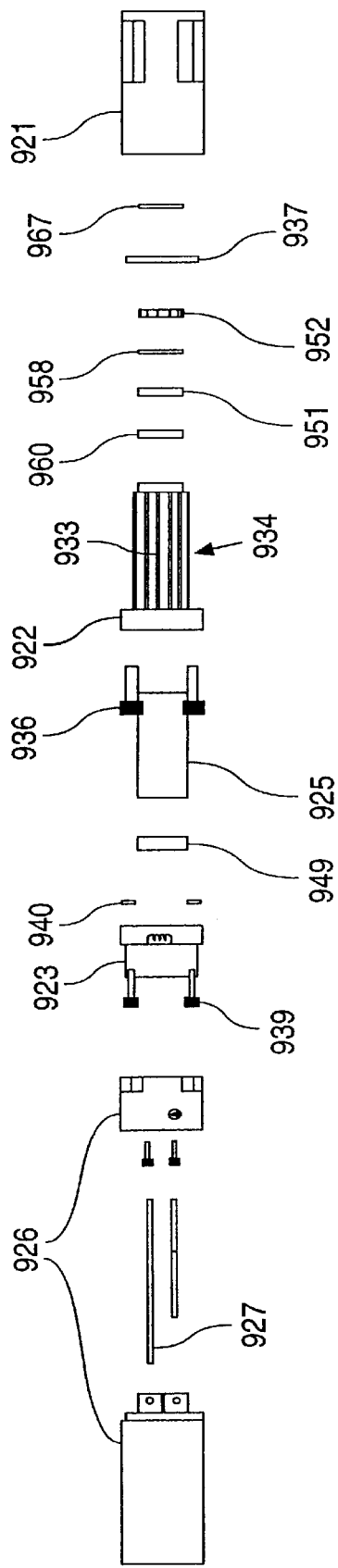
FIG. 14 shows an exploded view of a portion of the mass flow controller of FIG. 11, rotated 90° about the axis perpendicular to the vertical axis.
Figure 15:
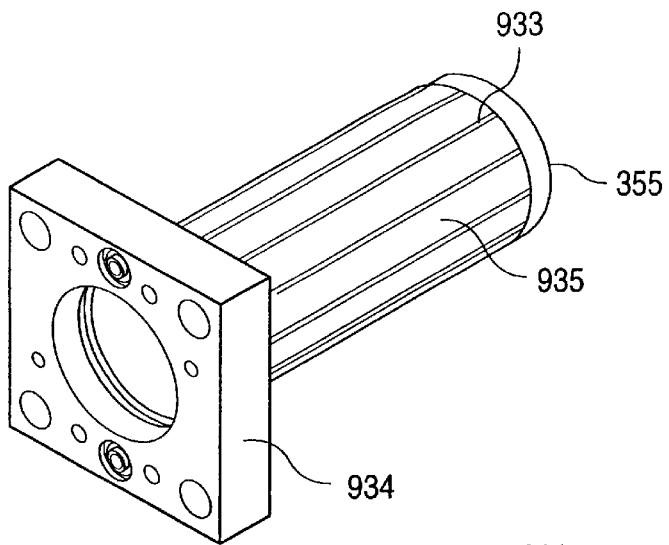
FIGS. 15 and 16 show a portion of the bypass assembly according to two embodiments of the present invention.

FIGS. 11–19 show an assembled mass flow controller 920 according to another embodiment of the present invention, with FIG. 14 showing an exploded view of parts of mass flow controller 920, rotated 90°, from FIG. 11. Referring to FIG. 11 and 14, mass flow controller 920 has three main sections: a controller block section 921, a bypass/valve section 922, and a sensor section 923. Bypass/valve section 922 with a solenoid core 924 and a solenoid coil 925 are contained within block section 921. A cover 926 encloses an electronic control printed circuit board (PCB) 927 and sensor section 923. Mass flow controller 920 is attached and sealed to a surface mount block, such as by screws 928 (FIG. 13) and fluid input/output seals 929.

Figure 16:
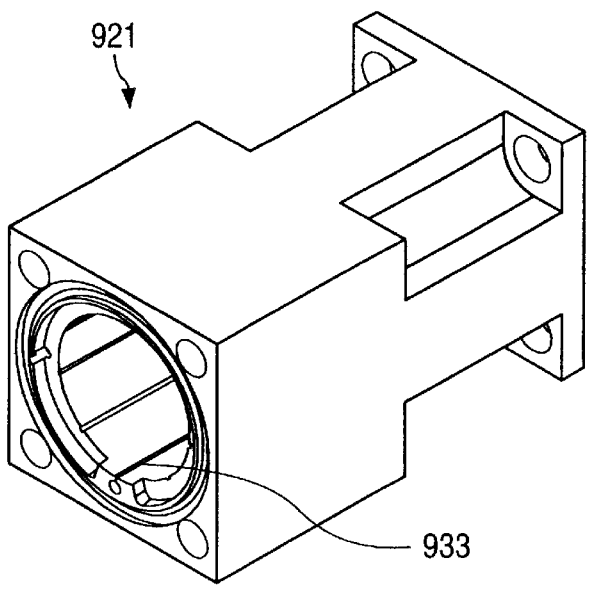

Referring to FIG. 11, fluid enters through an input port 930 and flows through a channel 931 into an input plenum 932 located within block 921, which is typically made of a non-ferromagnetic material. There, the fluid is split, with a majority of the fluid flowing along longitudinal grooves/channels 933 (FIGS. 14–16) formed in the generally cylindrical outer surface of a bypass/valve body 934, typically made from a ferromagnetic material. In various embodiments, grooves/channels 933 can be formed directly on bypass/valve body 934 (FIG. 14), on a sleeve 935 (FIG. 15), within a sleeve when the sleeve is a porous material that acts as grooves/channels 933, or on the inner surface of block 921 (FIG. 16). Bypass/valve assembly 922, which includes bypass/valve body 934, is attached to block 921, such as by screws 936 (FIG. 13) and seals 937 and 967 (FIGS. 11 and 14). Thus, in bypass/valve assembly 922 within block 921, the fluid flows from fluid input port 930 to fluid input plenum 932 to an output plenum 938.

Figure 12:
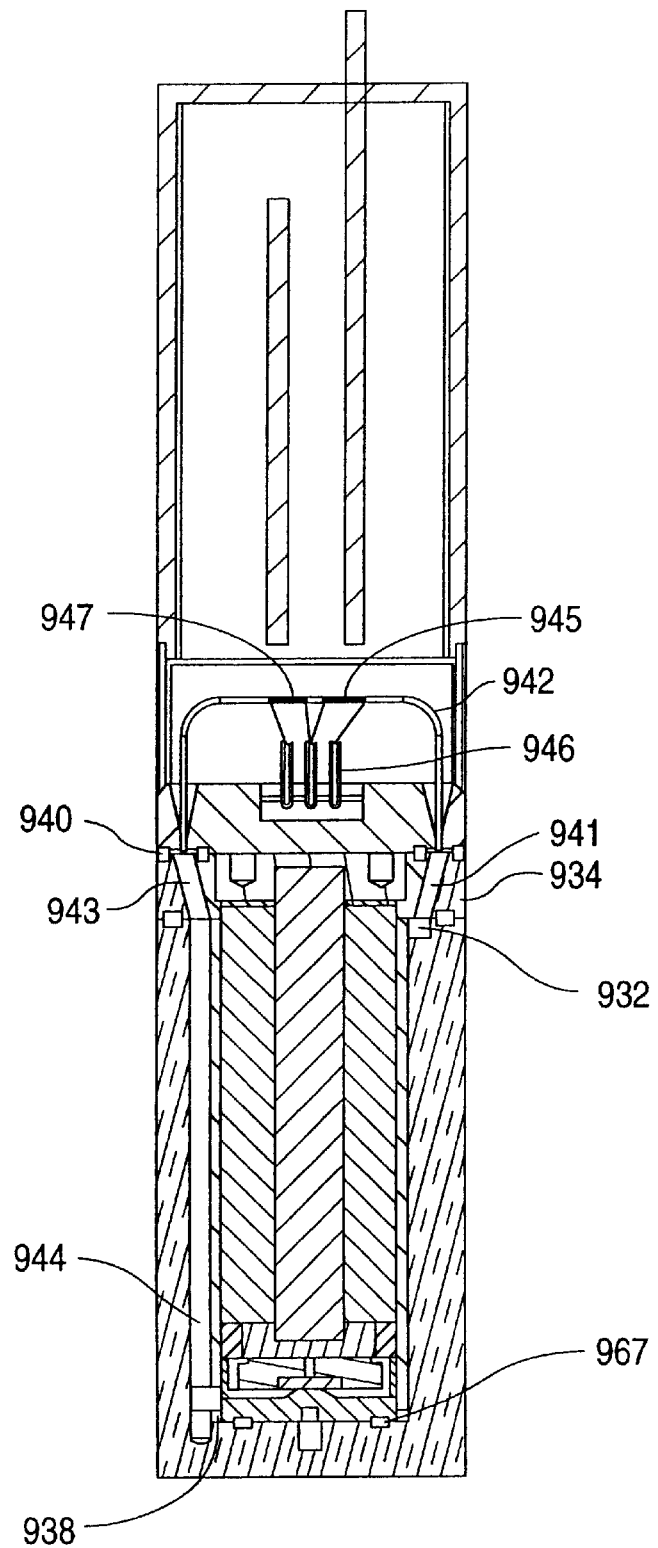
FIG. 12 shows the mass flow controller of FIG. 11, rotated 90° about the vertical axis.
Figure 13:
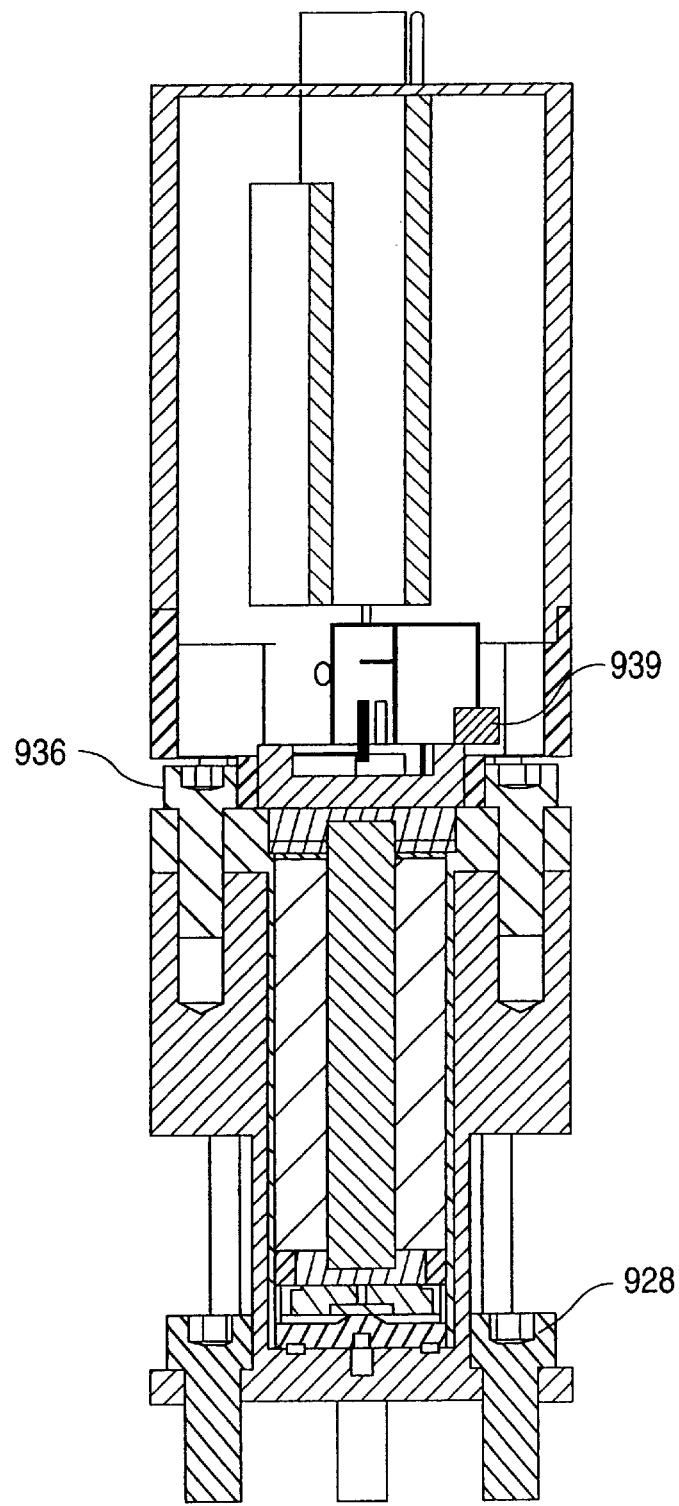
FIG. 13 shows the mass flow controller of FIG. 11 with securing screws.
Figure 19:
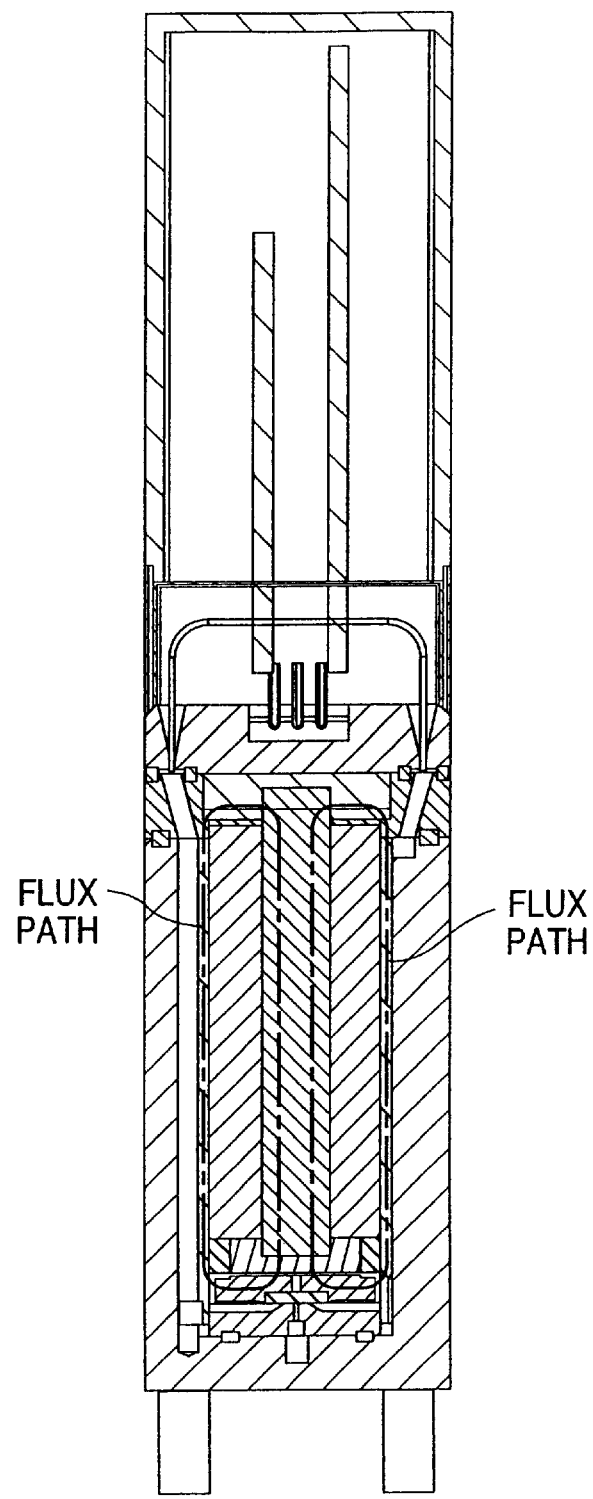
FIG. 19 shows the magnetic flux path through the mass flow controller of FIGS. 11 and 12.

Referring to FIGS. 11–14 and 19, sensor section 923 is attached to bypass/valve assembly 922, such as by screws 939 and seals 940, and can be mounted in any 3600 orientation substantially perpendicular to the flux path, as shown in FIG. 19. Sensor section 923 includes conventionally known and used thermal mass flow sensors. Referring to FIG. 12, the smaller portion of the split fluid flows through channel 941 located within bypass/valve body 934 into a sensor tube 942 and exits from sensor tube 942 into channel 943,located in bypass/valve body 934 and flows through channel 944 located within block 921, finally meeting the major portion of the split fluid at the output end of the bypass/valve assembly 922 at output plenum 938. Sensor tube 942 has wrapped around its outside a first heater/sensor coil 945 and connected to terminals 946.

Passing current through first coil 945 heats the fluid as it passes through sensor tube 942 in the vicinity of first coil 945. Current is also passed through a second coil 947 wrapped around sensor tube 942 in the downstream flow direction of the fluid, i.e., towards channel 943. As the fluid passes second coil 947, it gets hotter. However, the amount of heat transferred from coils 945 and 947 to the fluid is different because the fluid temperature is different at coils 945 and 947. This in turn changes the relative resistance of coils 945 and 947, which is measured as a voltage differential in an electrical bridge (e.g., a Wheatstone bridge). This voltage differential corresponds to the mass flow amount of fluid passing through sensor tube 942, and proportionally through bypass/valve assembly 922. Mass flow controller 920 includes electronic control PCB 927 to calculate the mass flow based upon the sensed change in voltage.

Bypass/valve assembly 922 contains core 924, typically made from a ferromagnetic material, surrounded by solenoid coil 925. One end of core 924 is in intimate contact with a valve pole 948, typically made from a ferromagnetic material. The other end of core 924 is in intimate contact with a solenoid cap 949, typically made from a ferromagnetic material. Cap 949, in turn, is in intimate contact with bypass/valve body 934. Valve pole 948 is separated from bypass/valve body 934 by a flux isolation ring 950, typically made from a non-ferromagnetic material.

An electronic servo control section on PCB 927 generates a current signal (depending upon the actual flow and the desired flow) for solenoid coil 925, which in turn generates magnetic flux proportional to the signal to move a plunger button assembly 951 (shown in greater detail in FIG. 17) to control the flow, as discussed in more detail below. The servo control system generates current through coil 925 to generate sufficient magnetic flux until the error signal (difference between the desired flow and actual flow) is minimized or approximately zero.

Figure 17:
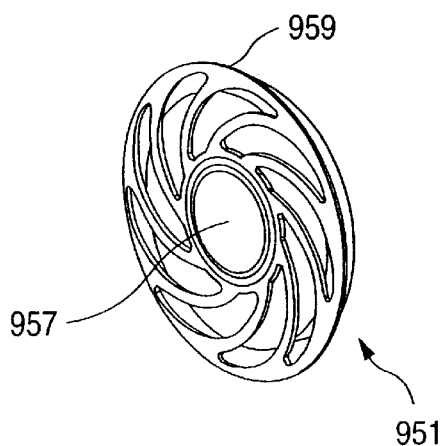
FIG. 17 shows a plunger button assembly according to one embodiment.
Figure 18:
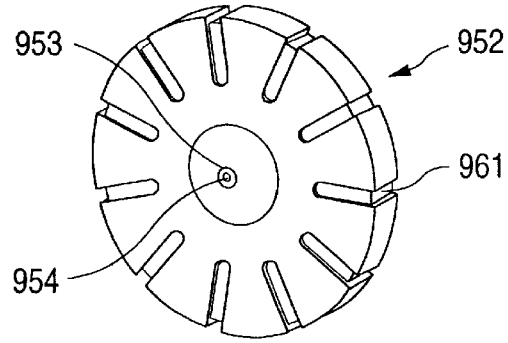
FIG. 18 shows an orifice plate according to one embodiment.

An orifice plate 952, as shown in FIG. 18, typically made of non ferromagnetic material, is generally flat on both faces, with the face towards plunger button assembly 951 having a frusto-conical portion 953. Frusto-conical portion 953 has an opening 954 extending through orifice plate 952, such that fluid can flow through orifice plate 952 to a fluid output channel 955 into an output port 956. Plunger button assembly 951, as shown in FIG. 17, has a smooth flat sealing surface 957 that sits on to frusto-conical portion 953. A spring pretension spacer 958 is positioned between plunger button assembly 951 and orifice plate 952, as shown in FIGS. 11 and 14. Spacer 958 is intended for the purpose of creating an appropriate amount of compression between plunger button assembly 951 and frusto-conical portion 953 by allowing a spring 959 in plunger button assembly 951 to bend to a desired extent by a plunger button capture spacer 960. The thinner the spacer 958, the greater the bending of spring 959 in plunger button assembly 951, consequently creating greater compression between plunger button assembly 951 and frusto-conical portion 953.

From output plenum 938, fluid flows through grooves/channels 961 (FIG. 18) formed into orifice plate 952 and into opening 954. The amount of fluid flowing into opening 954 depends on the positioning of plunger button assembly 951 in relation to orifice plate 952. As the attractive force to plunger button assembly 951, which is created by the magnetic flux, increases, plunger button assembly 951 is moved away from orifice plate 952, thereby increasing the amount of fluid flowing into opening 954. However, as the force decreases, spring 959 pushes plunger button assembly 951 towards orifice plate 952, thereby decreasing the fluid flow into opening 954. The regulated fluid from opening 954 then flows through a fluid output channel 955 and exits from output port 956.

Although the invention has been described with reference to particular embodiments, the description is only an example of the invention's application and should not be taken as a limitation. For example, the above description describes magnetic flux traveling from the input to the output. However, the magnetic flux can also travel from the output to the input along the direction of the bypass assembly for controlling the fluid flow. The concepts described above can then be modified to open or close the path of the fluid in response to the presence of the magnetic flux. Consequently, various adaptations and combinations of features of the embodiments disclosed are within the scope of the invention as defined by the following claims.

I claim:

1. A mass flow controller, comprising:
   a principal fluid channel extending between a fluid input port and a fluid output port and defining a principal fluid flow path;
   a secondary fluid channel in fluid communication with the principal fluid channel, the secondary fluid channel defining a secondary fluid flow path;
   a fluid flow sensor unit coupled to the secondary fluid channel;
   a magnetically activatable valve assembly located in the principal fluid flow path near the fluid output port and coupled to the sensor unit;
   a bypass element disposed along the principal fluid flow path; and
   a magnetic field generator in communication with the sensor unit and comprising a solenoid coil, the solenoid coil disposed in parallel with the bypass element and the principal fluid flow path,
   wherein the magnetic field generator generates a magnetic field in response to signals from the sensor unit, the magnetic field being coupled to the valve assembly so as to control fluid flow from the output fluid port.

2. The mass flow controller of claim 1, wherein the secondary fluid channel has a smaller fluid volume than the principal fluid channel.

3. The mass flow controller of claim 1, wherein the fluid flow sensor unit is disposed transverse to the principal flow channel.

4. The mass flow controller of claim 1, wherein the fluid flow sensor unit is disposed substantially orthogonal to the principal flow channel.

5. The mass flow controller of claim 1, wherein the magnetic field generator further comprises an electrical current generator coupled to the solenoid coil.

6. The mass flow controller of claim 1, wherein the magnetic field extends into the principal fluid flow path.

7. The mass flow controller of claim 1, wherein lines of flux from the magnetic field are substantially aligned with the principal fluid flow path.

8. The mass flow controller of claim 1, wherein lines of flux from the magnetic field are substantially coaxial with the principal fluid flow path.

9. The mass flow controller of claim 1, wherein the valve assembly comprises an orifice plate, a plunger button assembly abutting the orifice plate, and a biasing element which biases the plunger button assembly against the orifice plate in the absence of a magnetic field.

10. The mass flow controller of claim 1, wherein the valve assembly comprises an orifice plate, a plunger button assembly abutting the orifice plate, and a biasing element which biases the plunger button assembly against the orifice plate in the absence of a magnetic field, and wherein at least one of the orifice plate, the plunger button assembly and the biasing element is made of a substantially magnetically permeable material.

11. The mass flow controller of claim 1, wherein the valve assembly comprises an orifice plate, a plunger button assembly abutting the orifice plate, and a biasing element which biases the plunger button assembly against the orifice plate in the absence of a magnetic field, and wherein the biasing element comprises a spring.

12. The mass flow controller of claim 1, wherein the valve assembly comprises an orifice plate, a plunger button assembly abutting the orifice plate, and a biasing element which biases the plunger button assembly against the orifice plate in the absence of a magnetic field, and wherein the biasing element comprises a permanent magnet disposed within the magnetic field generator.

13. The mass flow controller of claim 1, wherein portions of the mass flow controller which are within the magnetic field are made of a magnetically permeable material so as to permit passage of magnetic energy therethrough.

14. The mass flow controller of claim 1, wherein the magnetic field extends into the principal flow path, and wherein portions of at least one of the principal flow channel, the bypass element, the secondary flow channel, the flow sensor unit, and the valve assembly are made of a magnetically permeable material so as to permit passage of magnetic energy therethrough.

15. The mass flow controller of claim 1, wherein the bypass assembly and solenoid coil are located along the same axis.

16. The mass flow controller of claim 1, wherein the bypass assembly and solenoid coil are located along separate axes.

17. The mass flow controller of claim 1, wherein the bypass assembly is located along the principal flow path and the solenoid coil is located out of the principal flow path.

18. The mass flow controller of claim 1, wherein the bypass assembly and solenoid coil are located along the principal flow path.

19. The mass flow controller of claim 1, wherein the fluid flow sensor is located directly above the principal fluid flow path.

* * * * *